(12) United States Patent
Ferran et al.

(10) Patent No.: US 8,997,576 B2
(45) Date of Patent: Apr. 7, 2015

(54) METHOD AND SYSTEM FOR MONITORING GAS PRESSURE FOR REFERENCE CAVITY OF CAPACITANCE DIAPHRAGM GAUGE

(71) Applicant: Reno Technologies, Inc., Wilmington, DE (US)

(72) Inventors: David J. Ferran, Del Mar, CA (US); Robert J. Ferran, San Diego, CA (US)

(73) Assignee: Reno Technologies, Inc., Wilmington, DE (US)

( * ) Notice: Subject to any disclaimer, the term of this patent is extended or adjusted under 35 U.S.C. 154(b) by 0 days.

(21) Appl. No.: 14/155,294

(22) Filed: Jan. 14, 2014

(65) Prior Publication Data

US 2014/0202254 A1    Jul. 24, 2014

Related U.S. Application Data (60) Provisional application No. 61/754,120, filed on Jan. 18, 2013.

(51) Int. Cl.
  *G01L 9/12*     (2006.01)
  *G01L 21/34*    (2006.01)
  *G01L 9/00*     (2006.01)

(52) U.S. Cl.
  CPC .............. *G01L 9/0072* (2013.01); *G01L 21/34* (2013.01); *G01L 9/0075* (2013.01)

(58) Field of Classification Search
  CPC ..... G01L 21/34; G01L 9/0072; G01L 9/0075; H01J 21/18; H01J 31/06; H01J 17/14
  USPC ............ 324/463; 313/157; 340/605; 70/40.7; 73/724
  See application file for complete search history.

(56) References Cited

U.S. PATENT DOCUMENTS

| | | | |
|---|---|---|---|
| 4,480,251 A * | 10/1984 | McNaughton et al. | 340/604 |
| 4,823,603 A | 4/1989 | Ferran et al. | |
| 5,396,803 A | 3/1995 | Ferran | |
| 5,515,711 A | 5/1996 | Hinkle | |
| 5,568,053 A * | 10/1996 | Drubetsky et al. | 324/463 |
| 6,837,112 B2 | 1/2005 | Ferran et al. | |
| 8,456,167 B2 * | 6/2013 | Key | 324/460 |
| 2009/0134018 A1 * | 5/2009 | Watanabe | 204/298.03 |

(Continued)

OTHER PUBLICATIONS

Green, Scott R. et al., Miniature Penning Cell Array for On-Chip Vacuum Pumping, 2011 IEEE 24th Conference on Micro Electro Mechanical Systems (MEMS), Jan. 23-27, 2011, pp. 1162-1165.

*Primary Examiner* — Hezron E Williams
*Assistant Examiner* — Truong Phan
(74) *Attorney, Agent, or Firm* — Jerry Turner Sewell (57) ABSTRACT

A system and method detect the presence of an unacceptable quantity of gas molecules in the reference vacuum cavity of a capacitance diaphragm gauge (CDG). An independent pressure transducer has an active portion exposed to the reference vacuum cavity. The transducer includes a ring anode, a cylindrical inner wall surface that forms at least one cathode, and a magnet positioned with respect to the ring anode such that the magnetic flux of the magnet is generally aligned with the central axis of the ring anode. A high voltage source applies a voltage between the ring anode and the cathode. A current sensor senses a magnitude of any current flowing between the ring anode and the cathode via ionized gas molecules. A monitoring unit monitors the magnitude of the current sensed by the current sensor and activates an alarm when the magnitude of the current exceeds an acceptable magnitude.

3 Claims, 6 Drawing Sheets

(56) References Cited

U.S. PATENT DOCUMENTS

| | | | |
|---|---|---|---|
| 2009/0212720 A1* | 8/2009 | Hu et al. | 315/307 |
| 2009/0272616 A1* | 11/2009 | Wilson et al. | 192/87.11 |
| 2010/0198545 A1 | 8/2010 | Berg et al. | |
| 2011/0164439 A1* | 7/2011 | Berton et al. | 363/21.09 |
| 2011/0271764 A1 | 11/2011 | Lee | |
| 2012/0103837 A1* | 5/2012 | Wall et al. | 205/793 |
| 2013/0233086 A1 | 9/2013 | Besling et al. | |
| 2014/0202254 A1* | 7/2014 | Ferran et al. | 73/724 |

\* cited by examiner

Figure 12

METHOD AND SYSTEM FOR MONITORING GAS PRESSURE FOR REFERENCE CAVITY OF CAPACITANCE DIAPHRAGM GAUGE

RELATED APPLICATIONS

The present application claims the benefit of priority under 35 USC §119(e) to U.S. Provisional Application No. 61/754,120 filed on Jan. 18, 2013, which is incorporated by reference herein.

BACKGROUND OF THE INVENTION

1. Field of the Invention

The present invention is in the field of capacitance diaphragm gauges which measure pressure based on the deflection of a diaphragm.

2. Description of the Related Art

Absolute capacitance diaphragm gauges (CDGs) measure pressure by sensing the capacitance change associated with deflection of a diaphragm whereby one side of the diaphragm ("the Px side") is exposed to the pressure to be measured (Px) and the other side of the diaphragm is exposed to a sealed reference vacuum cavity in which an ultrahigh vacuum (e.g., less than $10^{-9}$ Torr) has been created prior to the sealing of the reference cavity.

The CDG measures capacitance between a diaphragm and one or more fixed electrodes housed in the reference vacuum cavity. When the pressure on the Px side of the diaphragm is higher than the pressure in the reference vacuum cavity, the diaphragm deflects in the direction of the fixed electrode (or electrodes), which increases the measured capacitance. As the pressure on the Px side of the diaphragm decreases, the pressure differential across the diaphragm diminishes and the diaphragm moves away from the fixed electrode (or electrodes) in the reference vacuum cavity, which reduces the measured capacitance.

As the pressure on the Px side of the diaphragm approaches the pressure in the reference vacuum cavity, the pressure differential across the diaphragm becomes sufficiently small as to be considered as the "zero point" for the CDG. This fixed zero point is established during the calibration of the CDG and is used as a reference in subsequent pressure measurements.

CDGs are commonly used to the measure pressure in vacuum chambers in which thin or thick films of material are deposited on a substrate. One common example of usage is to measure pressure during the deposition of materials onto the surface of silicon wafers during the fabrication of semiconductor devices. CDGs are quite useful in vacuum deposition processes that utilize multiple gasses because capacitance diaphragm gauges are highly accurate and are able to measure absolute pressure independent of gas composition.

The accuracy of the measurement of pressure by a CDG can be negatively impacted by several factors, one of which is the integrity of the sealed reference vacuum cavity. As set forth above, the pressure within the reference vacuum cavity is quite low. The pressure must remain substantially constant in order to provide a constant reference pressure against which the pressure on the Px side of the diaphragm is measured. Any change in the pressure within the reference vacuum cavity will create a shift in the zero point of the CDG.

Although the reference vacuum cavity of the CDG is sealed, gas molecules may occur within the reference vacuum cavity and degrade the integrity of the reference vacuum cavity after the cavity is sealed. Common sources of gas molecules include, for example, outgassing from the internal surfaces of the reference cavity, leaks that may occur because of improper manufacturing techniques, diaphragm failure, and pinhole leaks in the diaphragm. When the rate that gas molecules enter the reference vacuum cavity and the resulting quantity of the molecules within the reference vacuum cavity are sufficiently low, the molecules that occur are substantially absorbed by getter material encapsulated in the reference vacuum cavity. Thus, the getter material is able to maintain the integrity of the reference vacuum cavity and prevent any shift in the zero point of the CDG.

Under some circumstances, the getter material is unable to sufficiently absorb all of the gas molecules entering the reference vacuum cavity, and the pressure in the reference vacuum cavity rises accordingly. In such circumstances, the CDG exhibits a negative zero shift which adversely impacts the accuracy of the CDG. The adverse effect on the accuracy of the CDG is often a cause of concern for users of CDGs. The problem is compounded because the reference vacuum cavity is a fully sealed assembly. Thus far, the sealed reference vacuum cavity has made it impossible for the user to detect the occurrence or the magnitude of any degradation of the reference vacuum cavity caused by gas molecules within the reference vacuum cavity. Furthermore, a CDG may experience other common phenomena that can cause the CDG to exhibit a negative zero shift. Such common phenomena have nothing to do with a degradation in the reference vacuum cavity; and, to date, there has been no way to distinguish between actual gas leaks into the reference vacuum cavity and other phenomena that create a similar negative zero shift symptom. This has made CDG diagnostics particularly problematic and has resulted in significant lost time and money for users of CDG devices.

SUMMARY OF THE INVENTION

A need exists for an apparatus and a method for detecting an increase in the pressure within the reference vacuum cavity of a CDG. The system disclosed and claimed herein is responsive to the need.

A system and method detect the presence of an unacceptable quantity of gas molecules in the reference vacuum cavity of a capacitance diaphragm gauge (CDG). An independent pressure transducer has an active portion exposed to the reference vacuum cavity. The transducer includes a ring anode, a cylindrical inner wall surface that forms at least one cathode, and a magnet positioned with respect to the ring anode such that the magnetic flux of the magnet is generally aligned with the central axis of the ring anode. A high voltage source applies a voltage between the ring anode and the cathode. A current sensor senses a magnitude of any current flowing between the ring anode and the cathode via ionized gas molecules. A monitoring unit monitors the magnitude of the current sensed by the current sensor and activates an alarm when the magnitude of the current exceeds an acceptable magnitude.

An aspect in accordance with embodiments disclosed herein is a method for detecting the presence of an unacceptable quantity of gas molecules in the reference vacuum cavity of a capacitance diaphragm gauge (CDG). The method comprises inserting an independent pressure transducer into the reference vacuum cavity of the CDG, wherein the independent pressure transducer comprises a ring anode, at least one cathode and a magnet. The magnet is positioned to generate a magnetic flux along a central axis of the ring anode. A high voltage is applied between the anode and the cathode to generate an electrical field to ionize gas molecules proximate to the anode and the cathode. The magnitude of a current flowing between the anode and the cathode via the ionized gas molecules is measured. The method senses when the magnitude of the current exceeds a predetermined acceptable current magnitude to thereby determine that the quantity of gas molecules in the reference vacuum cavity exceeds an acceptable quantity of gas molecules. In certain embodiments, the independent pressure transducer causes ionized gas molecules to be sputtered onto the cathode to thereby remove ionized gas molecules from the reference vacuum cavity. In certain embodiments, the predetermined unacceptable current magnitude is determined empirically by applying a known pressure to the reference vacuum cavity.

Another aspect in accordance with embodiments disclosed herein is a system that detects the presence of an unacceptable quantity of gas molecules in the reference vacuum cavity of a capacitance diaphragm gauge (CDG). An independent pressure transducer has an active portion exposed to the reference vacuum cavity. The independent pressure transducer comprises a ring anode that has a central axis. The independent pressure transducer further comprises a cylindrical inner wall surface that forms at least one cathode. A magnet is positioned with respect to the ring anode such that the magnetic flux of the magnet is generally aligned with the central axis of the ring anode. A high voltage source has a relatively positive voltage connected to the ring anode and has a relatively negative voltage connected to the cathode. A current sensor senses a magnitude of any current flowing between the ring anode and the cathode via ionized gas molecules. A monitoring unit monitors the magnitude of the current sensed by the current sensor and activates an alarm when the magnitude of the current exceeds an acceptable magnitude. In certain embodiments, the independent pressure transducer causes ionized gas molecules to be sputtered onto the cathode to thereby remove ionized gas molecules from the reference vacuum cavity.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

The improvements to capacitance diaphragms are disclosed herein with respect to exemplary embodiments of a system and a method. The embodiments are disclosed for illustration of the system and the method and are not limiting except as defined in the appended claims. Although the following description is directed to a particular embodiment of a capacitance diaphragm gauge, it should be understood that the disclosed system and method can be applied to other embodiments of capacitance diaphragm gauges.

Figure 1:
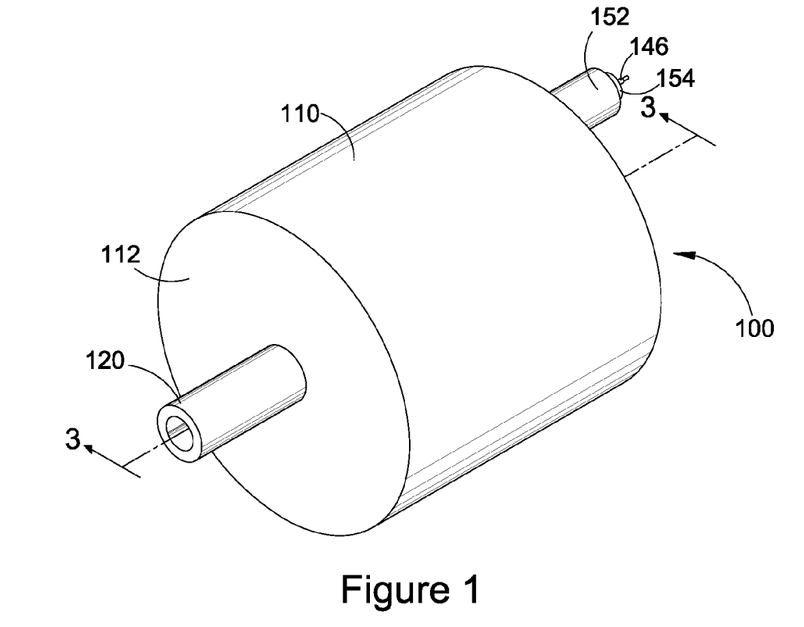
FIG. 1 illustrates a front perspective view of an exemplary capacitance diaphragm gauge (CDG), which is installable into a pneumatic system (not shown) to measure the pressure within the system.
Figure 2:
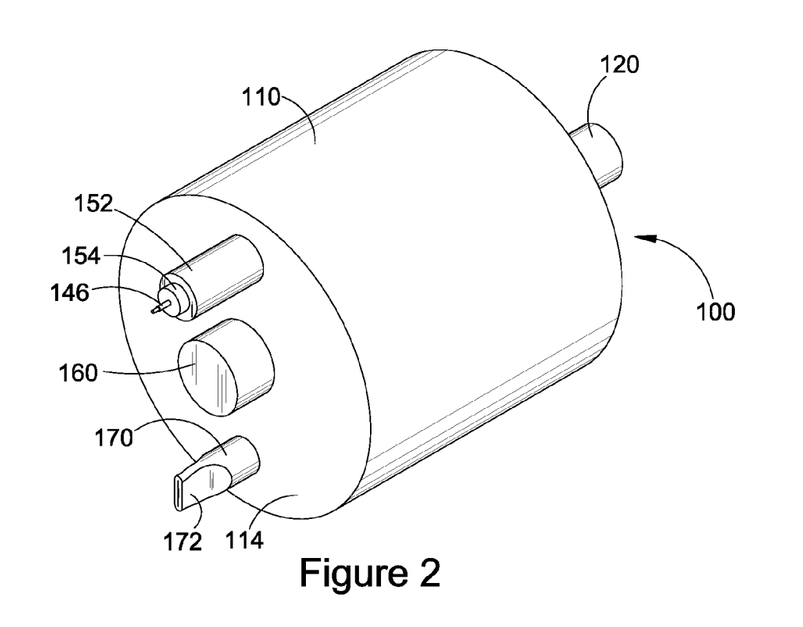
FIG. 2 illustrates a rear perspective view of the CDG of FIG. 1 which is rotated 180° from the view in FIG. 1.
Figure 3:
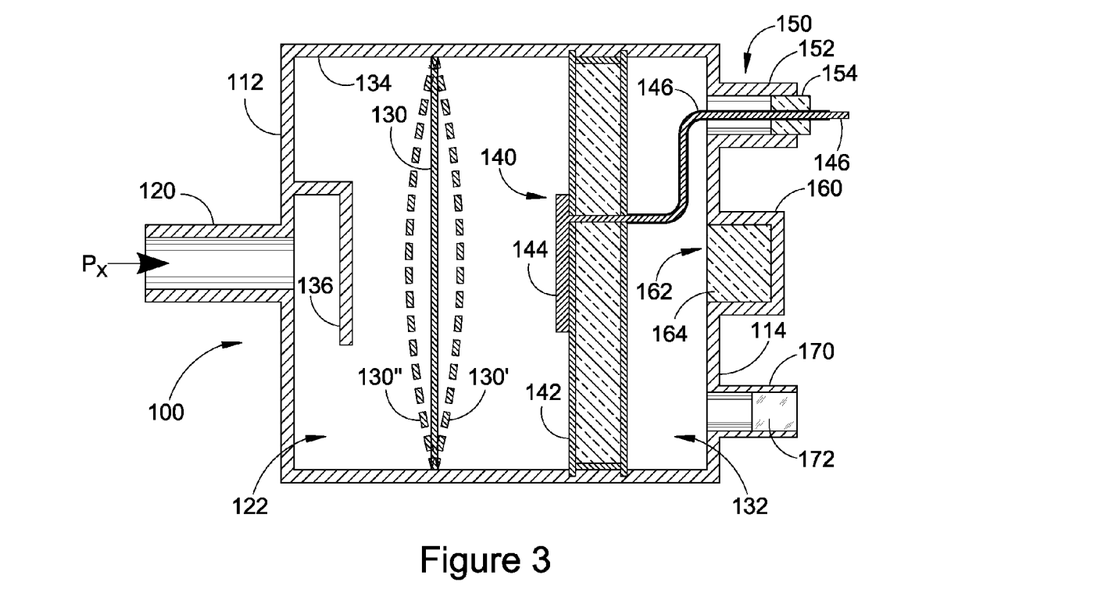
FIG. 3 illustrates a cross-sectional view of the CDG taken along the line 3-3 in FIG. 1, wherein the diaphragm appears undeflected in solid lines and appears in first and second deflected positions in dashed lines.

FIG. 1 illustrates a front perspective view of an exemplary capacitance diaphragm gauge (CDG) 100, which is installable into a pneumatic system (not shown) to measure the pressure within the system. In particular, the CDG is used to measure very low pressures resulting from evacuation of the pneumatic system. FIG. 2 illustrates a rear perspective view of the CDG of FIG. 1 which is rotated 180° from the view in FIG. 1. FIG. 3 illustrates a cross-sectional view of the CDG taken along the line 3-3 in FIG. 1.

In the illustrated embodiment, the CDG 100 comprises a hollow, generally cylindrical body structure 110, which extends between a first end surface 112 (FIG. 1) and a second end surface (rear wall) 114 (FIG. 2). A first cylindrical tube 120 extends from the first end surface. The first cylindrical tube provides pneumatic access to a first inner cavity 122 (FIG. 3) of the CDG. The first cylindrical tube is connectable to the pneumatic system (not shown) to allow the pressure of the system to be applied to the first inner cavity.

As shown in FIG. 2, a diaphragm 130 within the cylindrical body structure 110 separates the first inner cavity 122 from a second inner cavity 132. The diaphragm is sealed around its peripheral edges with respect to an inner surface 134 of the cylindrical body structure so that the first inner cavity is pneumatically isolated from the second inner cavity by the diaphragm. The diaphragm is also electrically connected to the cylindrical body structure, which is electrically connected to a ground reference, as discussed below.

In certain embodiments, the diaphragm 130 comprises Inconel 750 or another suitable material. In certain embodiments, the diaphragm has a thickness that can range from approximately 0.001 inch (0.025 mm) to approximately 0.015 inch (0.38 mm). The first inner cavity 122 also includes a baffle 136 that is positioned between the diaphragm and the first cylindrical tube 120. The baffle reduces the deposition of contaminants onto the surface of the diaphragm that faces the first inner cavity.

An electrode assembly 140 is positioned within the second inner cavity 132 between the diaphragm 130 and the second end surface 114. The electrode assembly comprises a mounting structure 142, which is secured to the inner surface 134 of the cylindrical body structure 110. The mounting structure of the electrode assembly is not sealed around the peripheral edges. Accordingly, both sides of the electrode assembly are at the same pressure within the second inner cavity. At least one electrode 144 is mounted on one side of the electrode assembly mounting structure. In particular, the electrode is mounted on the side of the mounting structure that faces the diaphragm. The electrode is electrically connected through the mounting structure. A conductor 146 extends from the mounting structure to a port 150 that extends through the second end surface 114 of the cylindrical body structure 110. The port 150 includes a second cylindrical tube 152 that extends outwardly from the second end surface. The conductor extends beyond the end of the second cylindrical tube. The conductor extends through a plug 154 that hermetically seals the second cylindrical tube around the conductor.

Although described herein with respect to one electrode on the electrode assembly, one skilled in the art will appreciate that the electrode assembly may include more than one electrode. See, for example, U.S. Pat. No. 4,823,603 to Ferran et al., which discloses two concentric fixed electrodes. U.S. Pat. No. 4,823,603 is incorporated herein by reference.

In the illustrated embodiment, a central portion 160 of the second end surface 114 extends outwardly to form an extended cavity portion 162 of the second inner cavity 132. The extended portion of the second inner cavity houses a getter 164. The getter functions in a conventional manner to remove small amounts of gas that may be released by the inner surface of the second inner cavity.

A third cylindrical tube 170 extends from the second end surface 114 of the cylindrical body structure 110. Initially, the entire length of the third cylindrical tube is uniformly cylindrical. The third cylindrical tube is connected to a vacuum evacuation system (not shown) to evacuate the gases from the second inner cavity 132 to create a desired low pressure within the second inner cavity. After the evacuation process is completed, an end portion 172 of the third cylindrical tube is crimped as shown in FIG. 1 to seal the second inner cavity to maintain the evacuated condition of the second inner cavity.

As illustrated in the cross-sectional view of FIG. 3, the diaphragm 130 is a thin metallic plate that separates the first inner cavity 122 from the second inner cavity 132. As discussed above, the second inner cavity is evacuated so that the absolute pressure within the second inner cavity is very low (e.g., approximately $10^{-9}$ Torr). The pressure within the first inner cavity is determined by the pressure Px of the system (not shown) to which the first cylindrical tube 120 is connected. When the pressure within the first inner cavity is substantially equal to the pressure within the second inner cavity, the diaphragm will not be deflected and will maintain the substantially flat shape shown by the solid cross-hatched profile (labeled as 130 in FIG. 3). If the pressure Px on the system side of the diaphragm (i.e., the pressure in the first inner cavity) exceeds the pressure in the second inner cavity, the center of the diaphragm will be deflected toward the second inner cavity and the diaphragm will bow into the second inner cavity as illustrated by a first dashed cross-hatched profile 130' in FIG. 3. If the pressure Px on the system side of the diaphragm is less than the pressure in the second inner cavity, the center of the diaphragm will be deflected toward to the first inner cavity and the diaphragm will bow into the first inner cavity as illustrated by a second dashed cross-hatched profile 130" in FIG. 3. In each case, the amount of the deflection will be determined by the pressure differential between the first and second inner cavities. The amount of deflection is also determined in part by the material properties of the diaphragm (e.g., the stiffness of the diaphragm).

As is well known in the art, the diaphragm 130 forms a first, movable plate of a variable capacitor. The electrode 144 on the electrode support structure 142 forms a second, fixed plate of the variable capacitor. When the diaphragm 130 is in the undeflected initial state, the capacitance of the variable capacitor has a first (initial) value determined by the initial distance between the diaphragm and the electrode. When the pressure Px increases, the diaphragm is deflected toward the second inner cavity and thus toward the fixed electrode as illustrated by the first dashed cross-hatched profile 130'. The deflection reduces the distance between the diaphragm and the electrode, which increases the capacitance of the variable capacitor. When the pressure Px decreases, the diaphragm is deflected toward the first inner cavity and thus away from the fixed electrode as illustrated by the second dashed cross-hatched profile 130". The deflection increases the distance between the diaphragm and the electrode, which decreases the capacitance of the variable capacitor. As discussed below, the capacitance is monitored and the increases and decreases in capacitance are used to determine corresponding increases and decreases in the system pressure Px. The CDG is initially calibrated by monitoring the changes in capacitance as a plurality of known values of the pressure Px are applied to the CDG.

Figure 4:
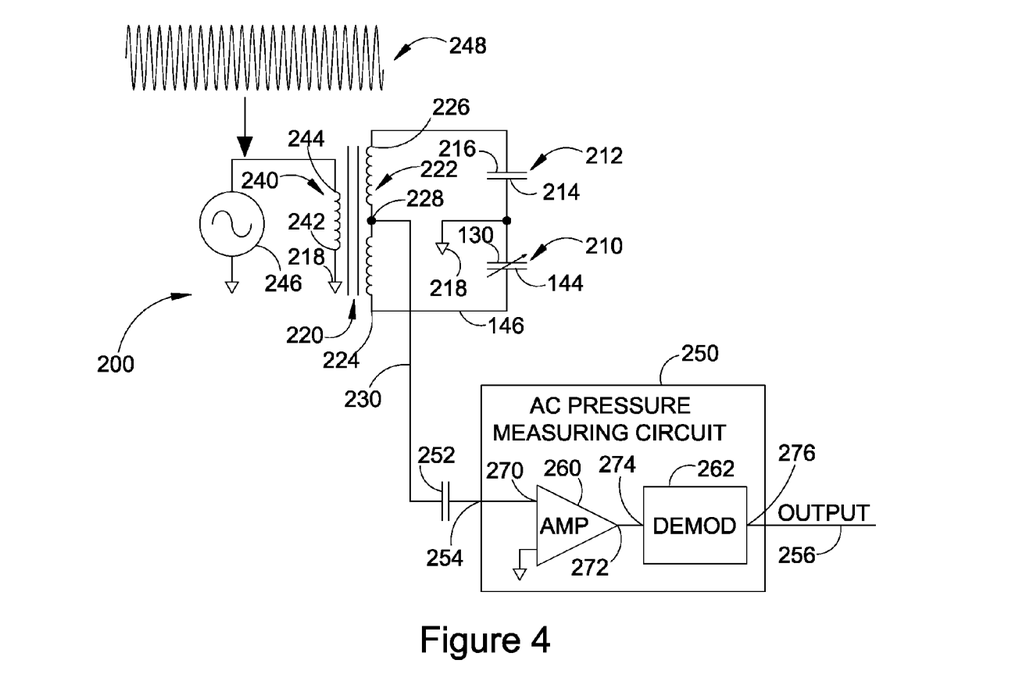
FIG. 4 illustrates a basic pressure monitoring system that monitors that the capacitance of the variable capacitor formed by the diaphragm and the fixed electrode of FIG. 3 to determine the deflection of the capacitor and thereby determine the pressure applied to the diaphragm.

FIG. 4 illustrates a simplified exemplary system 200 for monitoring the capacitance of the variable capacitor formed by the diaphragm 130 and the fixed electrode 144 of FIG. 3. The system comprises a first capacitor 210 and a second capacitor 212. The first capacitor comprises the variable capacitor formed by the diaphragm and the fixed electrode. Accordingly, a first electrode (the diaphragm) of the first capacitor is identified with the reference number 130, and a second electrode (the fixed electrode) of the first capacitor is identified with the reference number 144. The second capacitor is a conventional fixed capacitor. The second capacitor has a first electrode 214 and a second electrode 216.

The first electrode 130 of the first capacitor 210 and the first electrode 214 of the second capacitor 212 are connected to a ground reference 218. The second electrode 144 of the first capacitor is connected to a first terminal 224 of a center-tapped output (secondary) winding 222 of a transformer 220. The second electrode 216 of the second capacitor is connected to a second terminal 226 of the output winding of the transformer. A center-tap terminal 228 of the output winding of the transformer provides a signal output on a line 230.

In the illustrated embodiment, the first electrode (diaphragm) 130 of the first (variable) capacitor 210 is mechanically and electrically connected to the cylindrical body structure 110. The cylindrical body structure is electrically connected to the ground reference 218 when installed in the system having the pressure to be measured, thus providing the electrical connection of the diaphragm to the ground reference. The second electrode 144 of the first (variable) capacitor is connected to the second terminal of the transformer via the conductor 146 of FIG. 3.

In the illustrated embodiment, the capacitance of the second capacitor 212 is fixed. The capacitance of the second (fixed) capacitor is selected to be approximately equal to the initial capacitance between the diaphragm 130 and the fixed electrode 144 (e.g., the initial capacitance of the first (variable) capacitor 210) when the system pressure Px in the first inner cavity 122 is approximately equal to the pressure in the second inner cavity 132 as discussed above with respect to FIG. 3.

The transformer 220 has an input (primary) winding 240 having a first terminal 242 and a second terminal 244. The first terminal is connected to the ground reference 218. The second terminal is connected to a high frequency signal source 246 operating, for example, at a frequency of approximately 50 kilohertz as represented by an AC waveform 248.

The electrical conductor 230 connects the center tap 228 of the output winding 222 of the transformer 220 to an input 254 of an AC pressure measuring circuit 250 via an AC coupling capacitor 252. The AC pressure measuring circuit provides an output signal (OUTPUT) on an output signal line 256.

In the illustrated embodiment, the AC pressure measuring circuit 250 comprises an amplifier 260 and a demodulator 262. The signal on the center tap 228 of the output winding 222 of the transformer 220 is applied to an input 270 of the amplifier via the AC coupling capacitor 252. The amplifier preferably has a very high input impedance so that substantially zero current flows into the input of the amplifier. An output 272 of the amplifier provides an amplified output signal to an input 274 of the demodulator. An output 276 of the demodulator provides the output signal on the output signal line 256. The output signal is responsive to the variations in the capacitance of the first (variable) capacitor 210. Accordingly, the output signal varies in response to changes in the system pressure Px.

The signal generated by the high frequency signal source 250 is applied to the input (primary) winding 240 of the transformer 220. The applied signal is coupled to the secondary winding 222 and induces a high frequency voltage across the secondary winding. The induced voltage is applied across the series connection of the first (variable) capacitor 210 and the second (fixed) capacitor 212. The voltage across each capacitor is inversely proportional to the respective capacitance of the capacitor. Since the capacitance of the second (fixed) capacitor is substantially constant, the voltage across the first (variable) capacitor varies in accordance with the deflection of the diaphragm 130 caused by differential pressure across the diaphragm between the first inner cavity 122 and the second inner cavity 132 of the CDG 100. Because one electrode of each of each capacitor is electrically connected to the ground reference 218, a difference in the voltages across the two capacitors appears as a voltage differential across the output winding between the first input terminal 224 and the second input terminal 226 of the output winding of the transformer.

The voltage differential across the output winding 222 of the transformer 220 causes a voltage to appear on the center tap 228 of the output winding that is referenced to the ground reference 218 and that is proportional to the differences in the capacitance between the first (variable) capacitor 210 and the second (fixed) capacitor 212.

The voltage on the center tap 228 of the output winding 222 of the transformer 220 is applied via the conductor 230 and the AC coupling capacitor 252 to the input 270 of the amplifier 260. The amplifier amplifies the center tap voltage and provides the amplified signal as an output signal on the output 272. The output signal from the amplifier is a time-varying signal at the frequency of the signal source 250 with an amplitude that is proportional to the difference in capacitance of the first (variable) capacitor 210, which varies in response to changes in the pressure differential across the diaphragm 130. Accordingly, the amplitude of the time-varying signal output of the amplifier changes in response to changes in the pressure differential across the diaphragm.

The time-varying signal generated by the amplifier 260 is demodulated by the demodulator 262 in a conventional manner to provide the output signal on the output signal line 256 having a DC voltage level corresponding to the pressure differential across the diaphragm 130. The AC pressure measuring circuit is calibrated to equate the variations in the AC voltage to the absolute pressure (Px) applied to the diaphragm. In one embodiment, the demodulator comprises a synchronous demodulator known to the art.

Figure 5:
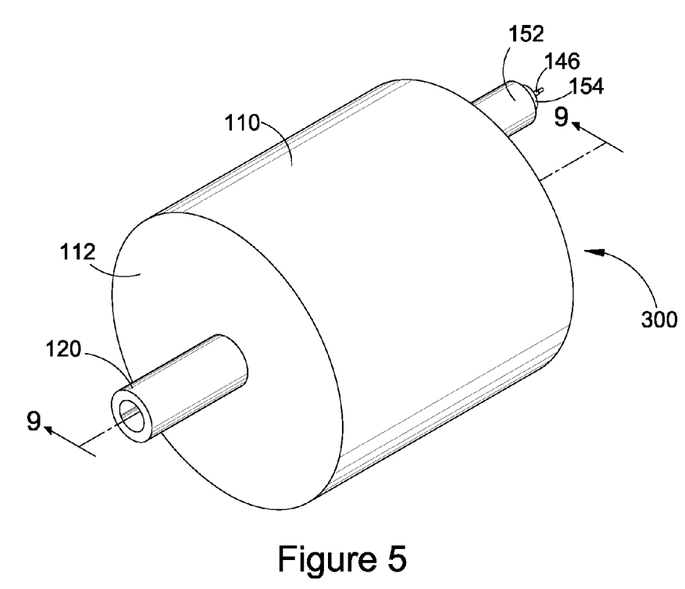
FIG. 5 illustrates a front perspective view of an improved capacitance diaphragm gauge (CDG) similar to the CDG in FIG. 1 but with an independent pressure transducer in the reference vacuum cavity.
Figure 6:
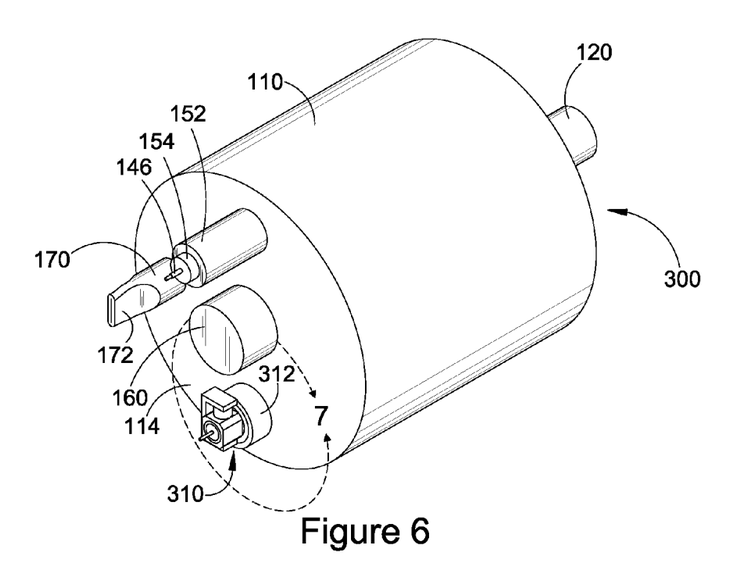
FIG. 6 illustrates a rear perspective view of the improved CDG of FIG. 5 which is rotated 180° from the view in FIG. 5 and which shows the external components of the independent pressure transducer.
Figure 7:
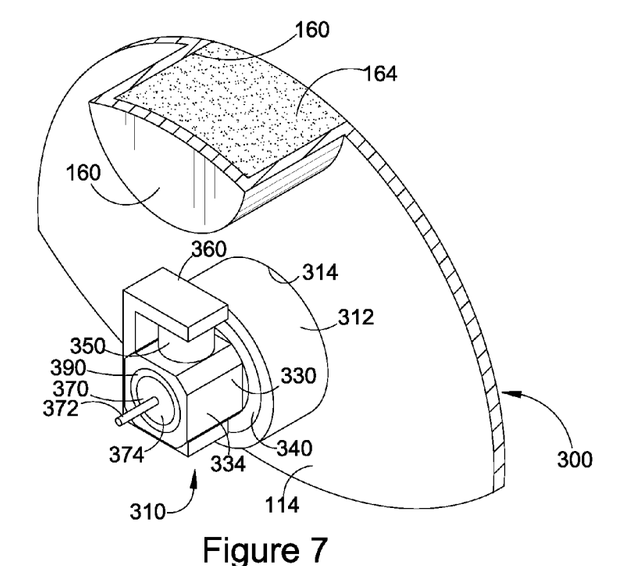
FIG. 7 illustrates an enlarged rear perspective view of the improved CDG of FIGS. 5 and 6 taken within the circular area -7- of FIG. 6.

FIGS. 5 and 6 illustrate a front perspective view and a rear perspective view of a modified CDG 300 that generally corresponds to the perspective views of the CDG 100 in FIGS. 1 and 2. FIG. 7 is a cross-sectional view taken along the line 7-7 in FIG. 5. In FIGS. 5, 6 and 7, like elements of the two CDGs are numbered the same and are not described again here. Note that for illustration purposes, the third cylindrical tube 170 is rotated by 90 degrees to a new position shown in FIG. 6 and thus does not appear in the cross-sectional view of FIG. 7.

Unlike the previously described CDG 100, the CDG 300 in FIGS. 5-7 includes an independent reference vacuum cavity pressure measuring unit (hereinafter "independent pressure transducer") 310. The independent pressure transducer is mounted in a cylindrical outer shell 312, which is welded into a circular opening 314 (see FIG. 11) on the second end surface (rear wall) 114 of the CDG. The independent pressure transducer extends into the second inner cavity ("reference vacuum cavity") 132 as shown in FIGS. 9 and 10.

The independent pressure transducer 310 is a miniature pressure transducer that may be any one of a number of configurations. In the illustrated embodiment, the independent pressure transducer is an ionization (cold cathode) pressure gauge that is controlled by a control unit 320 (FIG. 11), which also produces an output signal that represents the pressure measured by the independent pressure transducer. The output signal from the control unit is monitored by an external monitoring system 322, which monitors the output signal, compares the pressure represented by the output signal to an acceptable maximum pressure, and generates an alarm signal to an alarm indicator (e.g., an audible and/or visual signaling device) 324 when the pressure within the reference vacuum cavity exceeds the acceptable maximum pressure. When the user is notified that the pressure exceeds the acceptable maximum pressure, the user can replace the CDG with a new CDG and thereby avoid continuing to operate with incorrect pressure readings. In certain embodiments, the control unit and the external monitoring system may be combined into a single unit.

Figure 8:
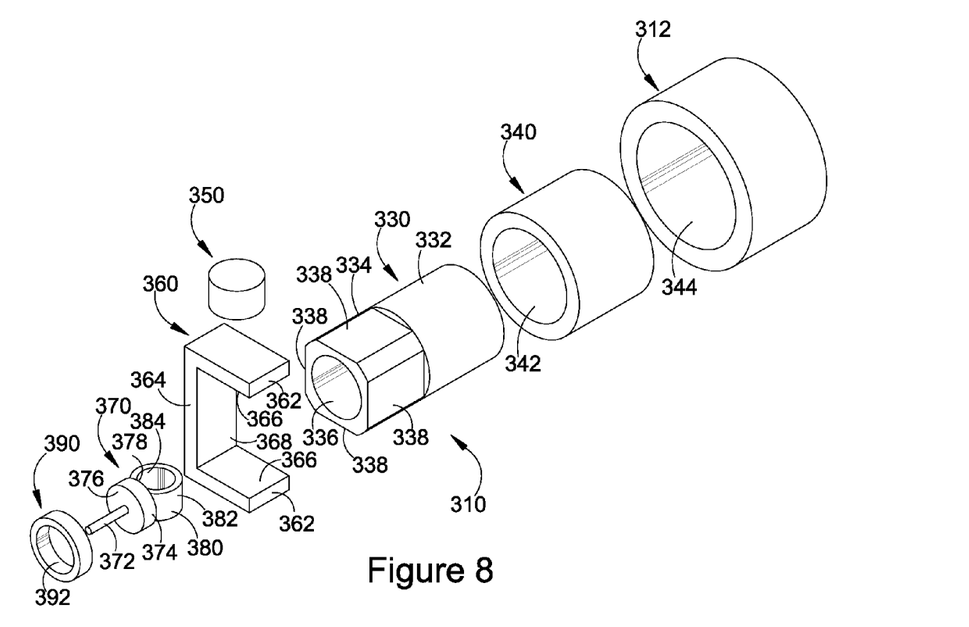
FIG. 8 illustrates an exploded perspective view of the independent pressure transducer of FIG. 7.
Figure 9:
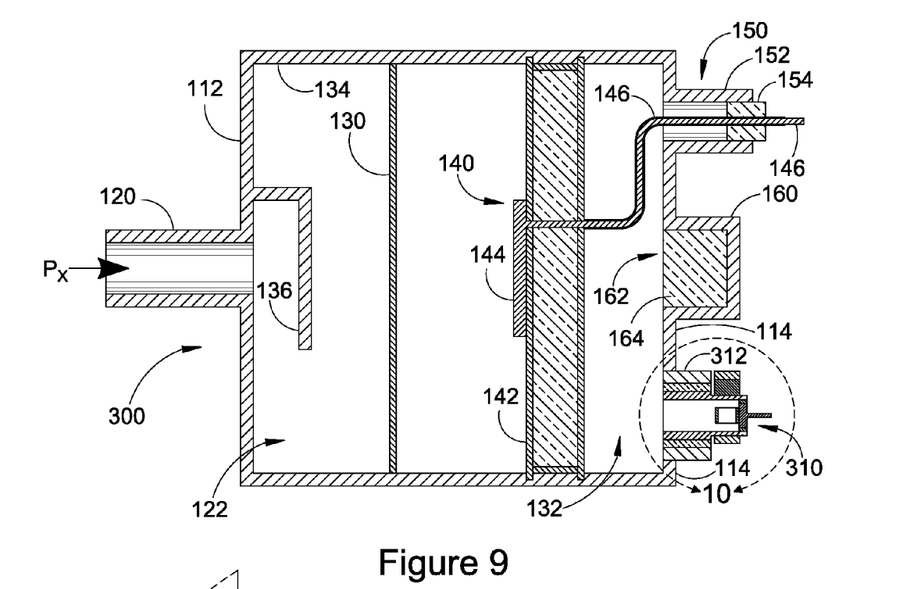
FIG. 9 illustrates a cross-sectional view of the CDG of FIGS. 5 and 6 taken along the line 9-9 in FIG. 5.
Figure 10:
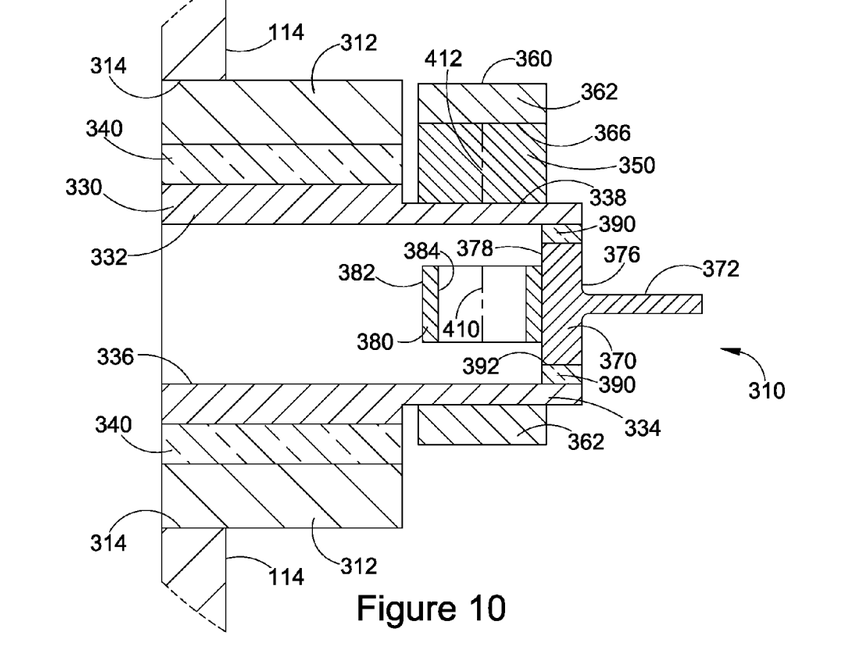
FIG. 10 an enlarged cross-sectional view of the CDG of FIG. 9 taken within the circular area -10- in FIG. 9, which shows the cross-sectional view of the independent pressure transducer in more detail.

The independent pressure transducer 310 is shown in more detail in the enlarged cross-sectional view in FIG. 8, the enlarged perspective view in FIG. 9 and exploded perspective view in FIG. 10. The transducer includes a transducer shell 330 that includes a first cylindrical portion 332 and a second squared portion 334. A common cylindrical bore 336 extends through the two portions. In the illustrated embodiment, the transducer shell comprises titanium, which has paramagnetic characteristics that are suitable for the transducer. In the illustrated embodiment, the transducer shell has an outer diameter of approximately 0.375 inch. The diameter of the inner bore is approximately 0.25 inch. The second squared portion of the second portion of the transducer shell is formed by four flat surfaces 338 formed symmetrically around the central axis of the second portion. In the illustrated embodiment, the four flat surfaces are formed at a distance of approximately 0.1575 inch from the central axis such that opposing flat surfaces are spaced apart by approximately 0.315 inch. The transducer shell has an overall length of approximately 0.625 inch. The second squared portion of the transducer has a length of approximately 0.25 inch. Accordingly, the first portion of the transducer has a length of approximately 0.375 inch.

The first cylindrical portion 332 of the transducer shell 330 is surrounded by a glass cylinder 340 comprising a glass that melts at a reasonably low temperature. Various types of glasses may be used. In the illustrated embodiment, the glass comprises a barium alkali glass having a relatively high temperature coefficient close to the temperature coefficient of stainless steel and titanium. The glass cylinder has an inner bore 342 sized to have an inner diameter substantially equal to the outer diameter of the first cylindrical portion of the transducer shell (e.g., approximately 0.375 inch) and to have an outer diameter substantially equal to the inner diameter of an inner bore 344 the cylindrical outer shell 312 (e.g., approximately 0.5 inch). The glass cylinder and the cylindrical outer shell have a respective length approximately equal to the length of the first cylindrical portion of the transducer shell (e.g., approximately 0.375 inch in the illustrated embodiment).

When assembled, the first cylindrical portion 332 of the transducer shell 330 is inserted into the glass cylinder 340 and the glass cylinder is inserted into the inner bore 344 of the cylindrical outer shell 312. The glass cylinder and the transducer shell are positioned with respect to the cylindrical outer shell such that the first cylindrical portion of the transducer shell is within the glass cylinder and the cylindrical outer shell and such that the second squared portion extends from the glass cylinder and the cylindrical outer shell as shown in FIGS. 5-7. Preferably, the transducer shell is positioned with one of the flat surfaces 338 in a horizontal plane as shown; however, such positioning is not required. After positioning the glass cylinder and the transducer shell within the cylindrical outer shell, sufficient heat is applied to soften the glass cylinder to cause the glass cylinder to flow and form a hermetic seal between the outside of the transducer shell and the inside of the cylindrical outer shell.

As further illustrated in the figures, the independent pressure transducer 300 includes a solid cylindrical magnet 350 having a diameter of approximately 0.2 inch and having a length of approximately 0.125 inch. The magnet is positioned on one of the flat surfaces 338 of the second squared portion 334 of the transducer shell 330 such that the magnet is generally centered on the surface. In the illustrated embodiment, the magnet is an axially magnetized neodymium magnet.

A magnet yoke 360 retains the magnet 350 in the selected position on the flat surface 338 of the second squared portion 332 of the transducer shell 330. In the illustrated embodiment, the magnet yoke has a generally U-shaped configuration with two end flanges 362 and an intermediate section 364 that interconnects the two flanges. The length of the intermediate section is selected so that respective inner surfaces 366 of the two flanges are spaced approximately 0.4 inch apart. The yoke comprises a ferromagnetic metal (e.g., soft iron) having a thickness of approximately 0.0625 inch and a width of approximately 0.2 inch. Each flange has a length of approximately 0.3275 inch. When the magnet is positioned on a flat surface (e.g., the uppermost flat surface in the illustrated embodiment) with the inner surface of one of the flanges in contact with the top of the magnet, the inner surface of the other flange is in contact with the opposing flat surface (e.g., the lowermost flat surface) of the second squared portion of the transducer shell. The dimensions of the magnet, the magnet yoke and the spacing of the flat surfaces are selected so that the magnet yoke secures the magnet firmly against the flat surface to provide a continuous magnetic path from upper flat surface, through the magnet, through the yoke, and to the lower flat surface. In the illustrated embodiment, an inner surface 368 of the intermediate portion of the yoke is positioned against a side flat surface of the second squared portion of the transducer shell.

The independent pressure transducer 300 further includes a high voltage assembly 370. The high voltage assembly comprises a high voltage pin 372 connected to a first surface 376 of a solid cylindrical base 374. The cylindrical base has a diameter of approximately 0.19 inch and has a length of approximately 0.0625 inch. The pin extends approximately 0.187 inch perpendicularly from the first surface of the base and has a diameter of approximately 0.03 inch. Preferably, the intersection of the pin with the surface of the base is filleted for additional strength. The cylindrical base has a second surface 378, which is electrically and mechanically secured to an outer surface 382 of a high voltage tube 380. The high voltage tube is cylindrical and has an inner bore 384. The high voltage tube has an outer diameter of approximately 0.187 inch. The inner bore of the high voltage tube has an inner diameter of approximately 0.137 inch, and has a length of approximately 0.12 inch. The second surface of the base is tangential to the outer surface of high voltage tube so that the pin extends in a radial direction from the central axis of the tube.

The independent pressure transducer 310 further includes a high voltage sealing ring 390 that has an inner bore 392 that has an inner diameter that is sized to be substantially the same as the diameter of the cylindrical base 374 of the high voltage assembly 370. The sealing ring has an outer diameter that is substantially the same as the diameter of the inner bore 336 of the transducer shell 330. In one embodiment, the sealing ring comprises glass such as, for example, barium alkali glass similar to the glass cylinder 340 described above.

The high voltage assembly 370 is inserted into the inner bore 336 of the transducer shell 330 with the high voltage tube 380 positioned in alignment with the magnet 350. Preferably, a central axis 410 of the high voltage tube is collinear with a central axis 412 of the magnet as shown in FIG. 10. The high voltage assembly is held in the selected position by the sealing ring 390. The sealing ring is positioned with the inner bore 392 of the sealing ring around the cylindrical base 374 of the high voltage assembly and with the outer circumference of the sealing ring in contact within the inner bore of the transducer shell. The sealing ring is heated to a sufficient temperature to cause the sealing ring to flow and hermetically seal the high voltage assembly within inner bore of the transducer shell. It should be understood that the positioning and sealing of the high voltage assembly in the transducer shell may be performed before positioning and sealing the transducer shell within the cylindrical outer shell 312. Similarly, the magnet 350 and the yoke 360 may be positioned on the second portion 332 of the transducer shell after the high voltage assembly is positioned and sealed.

The components of the independent pressure transducer 310 may be encapsulated in a potting compound after assembly is completed.

Figure 11:
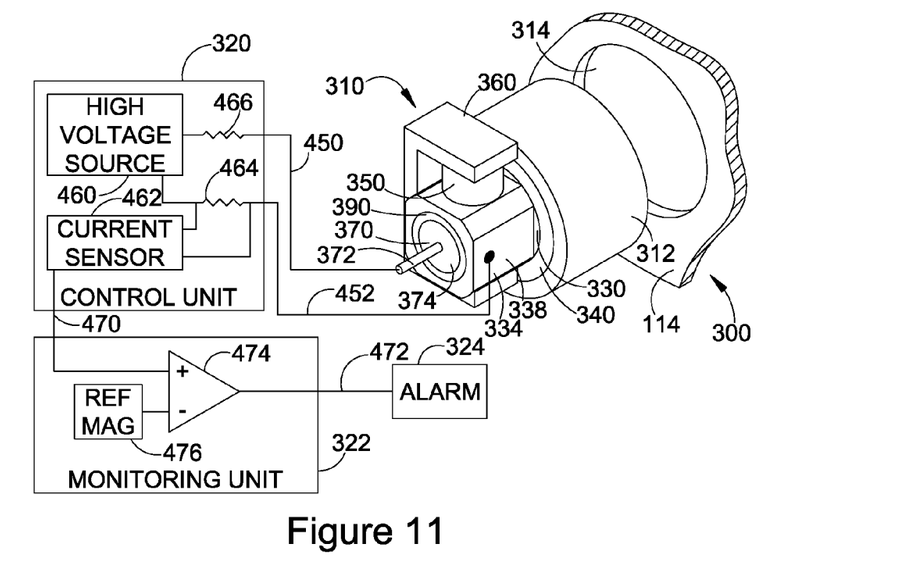
FIG. 11 illustrates a schematic representation of the reference cavity pressure monitoring system connected to the independent pressure transducer, the independent pressure transducer being shown prior to installation into the CDG.

In FIG. 11 illustrates a view of the assembled independent pressure transducer 310 before inserting the cylindrical outer shell 312 into the circular opening 314 in the rear wall 114 of the CDG 100. The assembled transducer may be tested in this configuration before the final installation into the CDG. The circuitry shown in FIG. 11 is used for the transducer after installation in the CDG and may also be used during testing before installation. After the assembled transducer is tested, the assembled transducer is mounted in the rear wall of the CDG and welded in place using conventional metal welding.

In certain embodiments, the cylindrical outer shell is welded to the surrounding rear wall on the inner surface of the rear wall before the rear wall is mounted to the body of the CDG.

In FIG. 11, the pin 372 of the high voltage assembly 370 is electrically connectable to a high voltage source conductor 450 from the control unit 320 (FIG. 11). The transducer shell 330 is electrically connectable to a high voltage return conductor 452 to the control unit. The return conductor may be connected directly to the exposed face 338 of the second squared portion 332 of the transducer shell in a conventional manner. As shown in FIG. 11, the high voltage conductor is electrically connected to a high voltage source 460 that provides a DC voltage of approximately 4,000 to 5,000 volts with respect to the high voltage return conductor. Accordingly, a relatively high DC voltage potential is applied to the ring anode 480 and a relatively low voltage potential is applied to the transducer shell and thus to the inner bore 336 of the transducer shell. It should be understood that in certain embodiments, the relatively low voltage potential is identified as a ground reference. In one particular embodiment, a current limiting resistor 454 is positioned between the high voltage source and the high voltage conductor limit the current that flows to the high voltage assembly. For example, in one embodiment, the currently limiting resistor may be approximately 2,000,000 ohms, which limits the current to no more than 2.5 milliamperes even if the transducer developed an internal short circuit.

As further shown in FIG. 11, the high voltage return conductor 452 includes a current sensor 462 that is used to measure the current flowing to and from the independent pressure transducer 310. For example, in one embodiment, the current sensor measures a voltage across a resistor 464. The voltage across the resistor produced by the current flowing through the resistor is measured to determine the magnitude of the current flow. In one embodiment, the current sensing resistor is approximately 100 ohms such that a current of approximately 1 microampere produces a voltage of approximately 100 microvolts across the sensing resistor. The current sensor provides an output signal on a line 470 that is connected to the monitoring unit 322 (which may be part of the control unit) that represents the sensed current magnitude. The monitoring unit monitors the sensed current magnitude to determine when the sensed current magnitude reaches or exceeds an acceptable magnitude. The monitoring unit activates the alarm 324 via line 472 when the current reaches or exceeds the acceptable magnitude. The monitoring unit advantageously includes a comparator 474 that compares the sensed current magnitude to a reference magnitude (REF MAG) 476. The reference magnitude may be set during a calibration process to correspond to the acceptable magnitude. The output of the comparator changes state when the current reaches or exceeds the reference magnitude.

The independent pressure transducer 310 operates in a known manner to ionize gas molecules that may be present in the reference vacuum cavity 132 and which are therefore present within the cylindrical bore 336 of the transducer shell 330. In particular, the high DC voltage applied to the pin 372 is conducted to the high voltage tube 380 to cause the high voltage tube to be at high voltage potential (e.g., 4,000-5,000 volts) with respect to the titanium transducer shell. Accordingly, the high voltage tube functions as a ring anode, and the inner surfaces of the cylindrical bore of the transducer shell proximate to the open ends of the high voltage tube function as at least one cathode. The portions of the inner surfaces of the cylindrical bore opposed to the upper and lower ends of the high voltage tube may be considered to be upper and lower cathodes with the other portions of the transducer shell providing electrical connections between the two cathodes. The entire inner surface of the cylindrical bore may also be considered to be a single cathode. The magnetic field flux generated by the magnet 350 and guided by the yoke 360 passes through the high voltage tube parallel to the cylindrical axis 410 of the high voltage tube.

The above-described configuration of the cylindrical anode (high voltage tube 380) and the cathodes (inner wall surfaces of the cylindrical bore 336) in the presence of the axial magnetic field of the magnet 350 may be referred to as a Penning cell. The strong axial magnetic field causes electrons emitted by the cathodes to spiral within the high voltage tube before colliding with the anode. Thus, the electrons travel a longer path from the cathode to the anode. The high voltage and the magnetic field effectively form a plasma within the high voltage tube. The increased paths traveled by the electrons within the plasma provide increased opportunities for the electrons to collide with and ionize gas molecules that may be present within the transducer shell. The ionized gas molecules migrate to the inner wall of the transducer shell where the gas molecules sputter the inner wall and expose fresh titanium. The exposed titanium operates as a secondary getter to remove reactive gases from the cylindrical bore and thus from the reference vacuum cavity 132. Ionized inert gas molecules are implanted in the walls of the cylindrical bore or are buried by sputter material.

The ionized gas molecules produced in the independent pressure transducer 310 also provide a current path from the anode (high voltage tube 380) to the cathodes (inner wall of the cylindrical bore 336). The magnitude of the current depends on the quantity of ionized gas molecules within the cylindrical bore, which is responsive to the quantity of gas molecules in the reference vacuum cavity 132. Since the pressure within the reference vacuum cavity 132 also depends on the quantity of gas molecules within the reference vacuum cavity, the magnitude of the current is representative of the pressure within the reference vacuum cavity. In particular, an increase in the pressure will result in an increase in the measured current. As long as the primary getter 164 is able to remove most of the gas molecules that may appear, the current should remain at a nearly zero value. When the primary getter becomes unable to remove the gas molecules as the molecules appear in the reference vacuum cavity, the getter function of the independent pressure transducer removes gas molecules as described above, and the measured current increases to a low, non-zero magnitude. The measured current starts increasing to a higher magnitude when the rate at which gas molecules are ionized in the independent pressure transducer increases. The increased current may be caused by a leak or other occurrence that prevents the primary getter from removing substantially of the gas molecules. In one embodiment, the operation of the independent pressure transducer can be calibrated with known partial pressures of gas in a test reference vacuum cavity to develop an empirical relationship between the measured current and the gas pressure. The current limit sensor (comparator) 474 in the external monitoring system 322 detects when the measured current reaches a maximum acceptable level. The external monitoring system triggers the alarm 324 when the maximum acceptable level is reached or exceeded. The user is then able to remove and replace the defective CDG 300 before the pressure within the reference vacuum cavity becomes sufficiently great to severely impact the pressure measured by the CDG.

Figure 12:
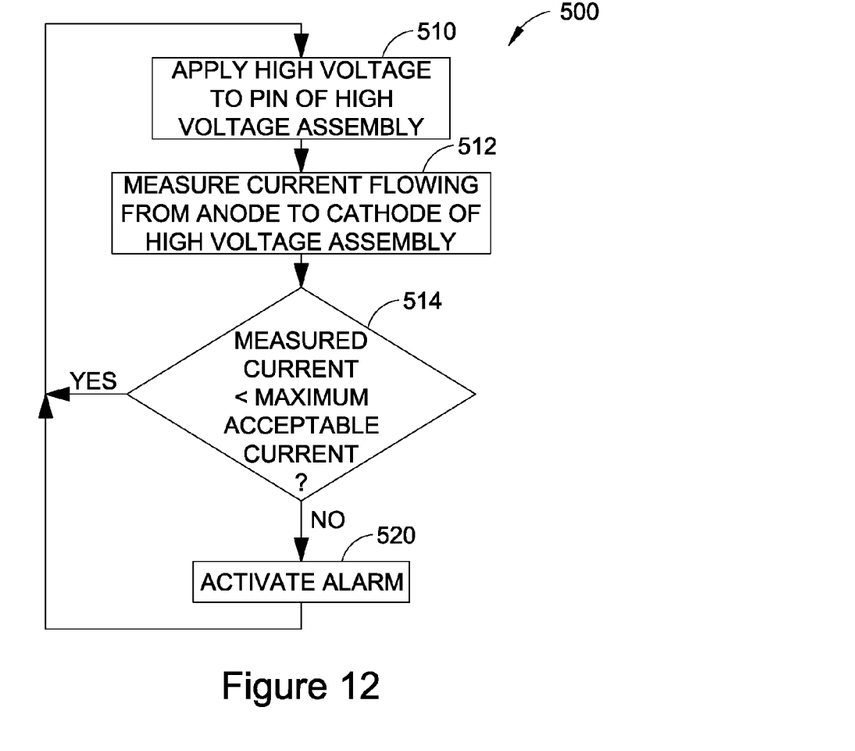
FIG. 12 illustrates a flow chart of the operation of the reference vacuum cavity integrity monitoring system of FIG. 11.

The operation of the independent pressure transducer is illustrated in a flowchart 500 shown in FIG. 12. The flowchart represents the functions of the control unit 320 and the external monitoring unit 322. Both units are represented as hardware functions; however, either or both units may be implemented in part by software routines residing in a microcontroller or the like.

In a step 510, the control unit 320 applies a high voltage to the pin 372 of the high voltage assembly 310 via the high voltage conductor 450. In a step 512, the control unit measures the current through the current sensor resistor 464 (FIG. 11). As discussed above, this current represents the current flow from the anode (high voltage tube 380) to the cathodes (inner wall of the cylindrical bore 336) of the high voltage assembly caused by ionized gas molecules. In a decision step 514, the measured current is compared to a maximum acceptable current by the current sensor (comparator) 474 in the external monitoring unit 322. If the current is less than the maximum acceptable current, the process returns to the step 510 and repeats the process. If the current is at or above the maximum acceptable current in the decision step, the process performs a step 520, in which the external monitoring unit activates the alarm 324. The process then returns to the step 510 and repeats the process. In one embodiment, the alarm remains activated until manually reset by the user. It should be understood that the step 510 of applying the high voltage may not be a discrete step in certain embodiments in which the high voltage is applied continuously to the pin.

As various changes could be made in the above constructions without departing from the scope of the invention, it is intended that all the matter contained in the above description or shown in the accompanying drawings shall be interpreted as illustrative and not in a limiting sense.

What is claimed is:

1. A method for detecting the presence of an unacceptable quantity of gas molecules in the reference vacuum cavity of a capacitance diaphragm gauge (CDG), the method comprising:
    inserting an independent pressure transducer into the reference vacuum cavity of the CDG, the independent pressure transducer comprising a ring anode, at least one cathode and a magnet, the magnet positioned to generate a magnetic flux along a central axis of the ring anode;
    applying a high voltage between the anode and the cathode to generate an electrical field to ionize gas molecules proximate to the anode and the at least one cathode;
    measuring a magnitude of a current flowing between the anode and the cathode via ionized gas molecules; and
    sensing when the magnitude of the current exceeds a predetermined acceptable current magnitude to thereby determine that the quantity of gas molecules in the reference vacuum cavity exceeds an acceptable quantity of gas molecules.

2. The method as defined in claim 1, wherein the independent pressure transducer causes ionized gas molecules to be sputtered onto the cathode to thereby remove ionized gas molecules from the reference vacuum cavity.

3. The method as defined in claim 1, wherein the predetermined unacceptable current magnitude is determined empirically by applying a known pressure to the reference vacuum cavity.

* * * * *